(12) United States Patent
Corts

(10) Patent No.: US 8,353,192 B2
(45) Date of Patent: Jan. 15, 2013

(54) LINEAR BEARING PLATE FOR ROLLING MILL

(75) Inventor: Jochen Corts, Remscheid (DE)

(73) Assignee: CORTS Engineering GmbH & Co. KG, Remscheid (DE)

( * ) Notice: Subject to any disclaimer, the term of this patent is extended or adjusted under 35 U.S.C. 154(b) by 959 days.

(21) Appl. No.: 12/263,260

(22) Filed: Oct. 31, 2008

(65) Prior Publication Data

US 2009/0165521 A1 Jul. 2, 2009

Related U.S. Application Data

(60) Provisional application No. 60/984,366, filed on Oct. 31, 2007.

(51) Int. Cl.
*B21B 27/06* (2006.01)
*B21B 45/02* (2006.01)
*B21B 28/00* (2006.01)

(52) U.S. Cl. ............................................. 72/236; 72/43

(58) Field of Classification Search ................ 72/43, 44, 72/237–238, 244–246, 248–250, 241.2, 241.4, 72/242.2, 236
See application file for complete search history.

(56) References Cited

U.S. PATENT DOCUMENTS

| | | | |
|---|---|---|---|
| 991,547 A | 5/1911 | Schad | |
| 1,869,208 A | 7/1932 | McMillen | |
| 2,034,278 A | 3/1936 | Becket et al. | |
| 2,178,149 A | 10/1939 | Strickland | |
| 3,076,524 A * | 2/1963 | Avallone et al. | 184/7.4 |
| 3,208,804 A | 9/1965 | Stenert et al. | |
| 3,350,773 A | 11/1967 | Beebe, Jr. et al. | |
| 3,355,924 A * | 12/1967 | Sendzimir | 72/242.2 |
| 3,434,322 A | 3/1969 | Cowles et al. | |
| 3,640,592 A | 2/1972 | Howe, Jr. | |
| 3,694,174 A | 9/1972 | Briggs | |
| 3,727,999 A | 4/1973 | Dunn et al. | |
| 3,791,706 A | 2/1974 | Dobson | |
| 3,806,214 A | 4/1974 | Keiser | |
| 3,924,907 A | 12/1975 | Czernik et al. | |
| 3,999,031 A | 12/1976 | Yonezawa et al. | |
| 4,015,765 A | 4/1977 | Ahmed | |

(Continued)

FOREIGN PATENT DOCUMENTS

DE 1107173 B 5/1961

(Continued)

OTHER PUBLICATIONS

Written Opinion and Search Report of PCT/IB2008/003863 mailed Aug. 6, 2009.

*Primary Examiner* — Dana Ross
*Assistant Examiner* — Mohammad I Yusuf
(74) *Attorney, Agent, or Firm* — Briggs and Morgan, P.A.; John F. Klos; Audrey J. Babcock

(57) ABSTRACT

A linear bearing plate, or liner, for use within a rolling mill stand, said liner including lubrication ports in fluid communication with a lubrication source. A centralized lubrication source can provide a predetermined lubrication to a plurality of mill stands in response to a signal, such as from a rolling facility operator. Lubrication ports provide areas of active lubrication which are surrounded by areas of passive lubrication so as to provide adequate lubrication during a rolling campaign.

16 Claims, 15 Drawing Sheets

U.S. PATENT DOCUMENTS

| | | |
|---|---|---|
| 4,343,072 A | 8/1982 | Beauchet |
| 4,402,207 A | 9/1983 | Buder |
| 4,427,241 A | 1/1984 | Jatczak |
| 4,537,050 A | 8/1985 | Bryant et al. |
| 4,944,606 A | 7/1990 | Lindsey et al. |
| 5,365,764 A | 11/1994 | Kajiwara et al. |
| 5,716,147 A | 2/1998 | Cook et al. |
| 5,804,134 A | 9/1998 | Tomat et al. |
| 5,860,309 A | 1/1999 | Drigani |
| 5,997,665 A | 12/1999 | Brisson et al. |
| 6,000,853 A | 12/1999 | Lytwynec et al. |
| 6,065,318 A | 5/2000 | Maniwa et al. |
| 6,076,388 A | 6/2000 | Kajiwara et al. |
| 6,158,260 A | 12/2000 | Ginzburg |
| 6,250,120 B1 | 6/2001 | Osgood et al. |
| 6,338,262 B1 | 1/2002 | Donini et al. |
| 6,354,128 B1 | 3/2002 | Donini et al. |
| 6,416,846 B2 | 7/2002 | Long |
| 6,510,721 B1 | 1/2003 | Yamamoto et al. |
| 6,814,493 B2 | 11/2004 | Wobben |
| 6,959,571 B2 | 11/2005 | Yamamoto et al. |
| 6,966,753 B2 | 11/2005 | Long et al. |
| 7,225,657 B2 | 6/2007 | Slawinski |
| 7,461,532 B2 * | 12/2008 | Wojtkowski et al. ............ 72/236 |
| 2004/0042689 A1 | 3/2004 | Wasson et al. |
| 2008/0205812 A1 | 8/2008 | Landwehr |

FOREIGN PATENT DOCUMENTS

| | | |
|---|---|---|
| DE | 9315675.8 | 3/1995 |
| DE | 10037413 | 1/2002 |
| EP | 1583619 | 7/2004 |
| WO | WO2004058426 A2 | 7/2004 |

* cited by examiner

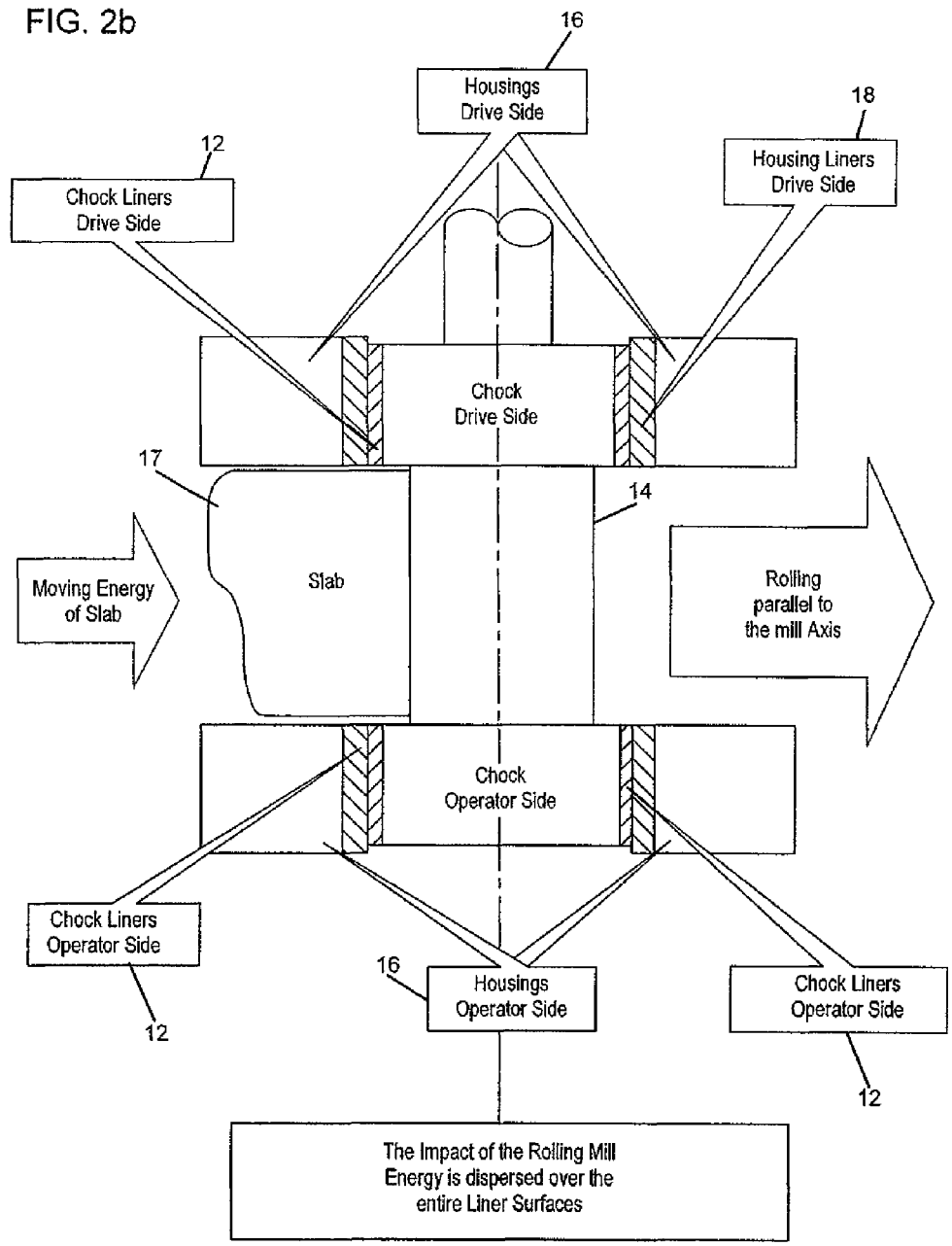

LINEAR BEARING PLATE FOR ROLLING MILL

RELATED APPLICATIONS

This application claims benefit of priority of U.S. Ser. No. 60/984,366, filed Oct. 31, 2007, which is hereby incorporated by reference in its entirety.

BACKGROUND OF THE INVENTION

Linear bearings or liners have been used to provide a flat guiding module or plate-type bearing elements for rolling stand frames. These bearings typically have at least one slide-bearing surface in contact with another bearing surface and are particularly prone to wear and tear within the hostile rolling environment. Versions of linear bearings are disclosed in PCT applications, PCT/EP02/03010 and PCT/EP03/014573, each document being incorporated by reference herein.

To obtain precisely rolled products, all clearances throughout the rolling system must be evaluated and held to the tightest possible tolerances. Failure to maintain bearing clearances often results in a substantial economic reduction of the product, increased maintenance costs, excessive component wear, and other dangerous conditions.

It has been recognized that bearing wear is often determined by outside influences and mechanical effects such as abrasion, chamfer wear and wear of mounting surfaces. Abrasion may result from scale and abrasive particles, severely worn bearing surfaces from any relative movement between chock and housing, corrosion and localized overloads. Chamfer wear may result in damaged chamfers, reduced bearing surface area, imprecise guidance during chock loading, and open passages for water and abrasive particles. Corrosion (or erosion) may be caused by cooling water chemicals, high pressure descaling water and shimming. Corrosion may result in washed out lubrication, increased humidity, fretting defects and pop-outs of liner material. Wear of liners may also result from heavy impact loads, such as hammering, localized overloads and corrosion/erosion.

SUMMARY OF THE INVENTION

Addressing the deficiencies of the conventional art, embodiments in accordance with the present invention resolve many linear bearing problems in an efficient, cost effective manner. The present invention relates to a mill stand with a liner plate having a plurality of lubricant conduits and apertures and an apparatus for delivering lubricant to the plates. The system may include a centralized lubricant source or a plurality of discrete lubricant sources.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In the accompanying drawings which form part of the specification and wherein like numerals and letters refer to like parts wherever they occur.

DETAILED DESCRIPTION OF THE INVENTION

Figure 1:
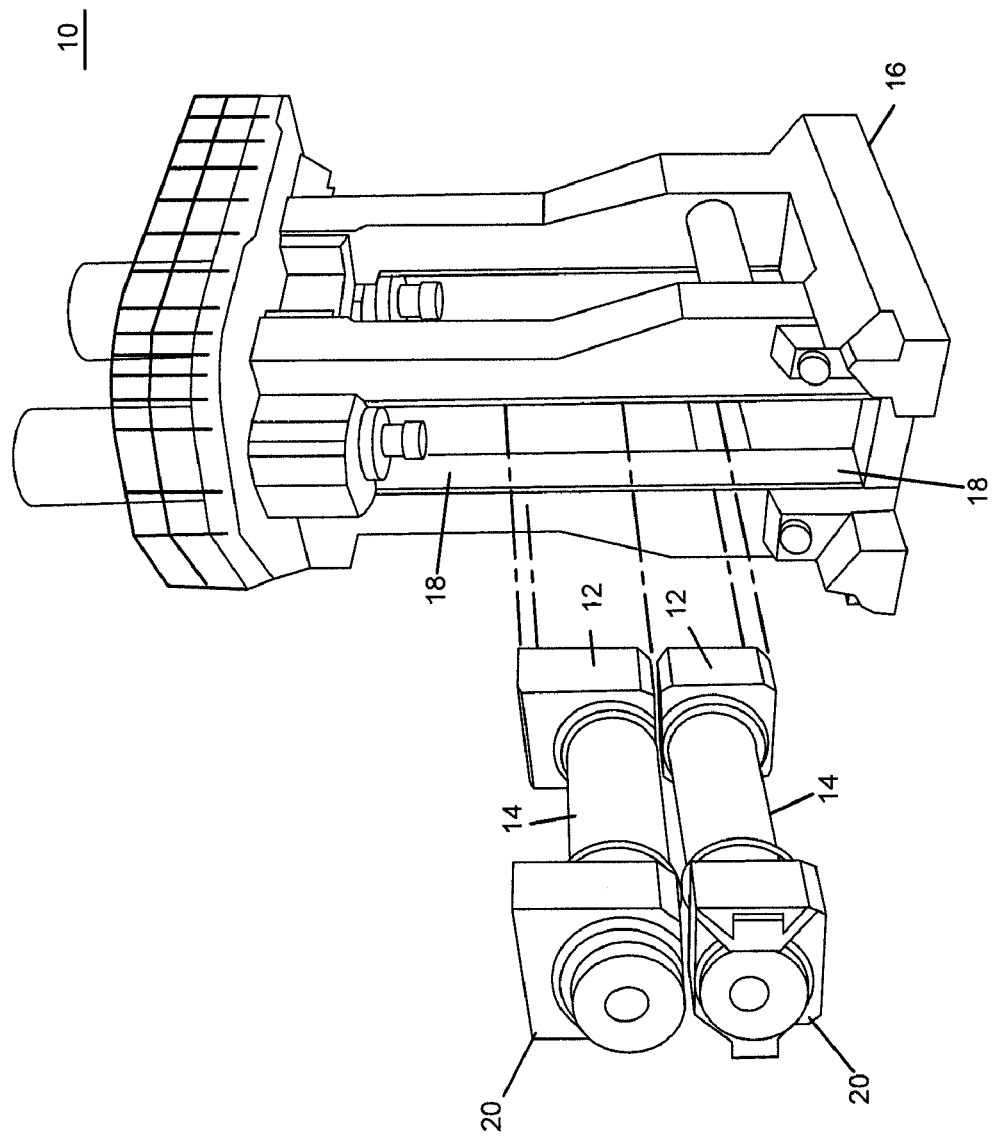
FIG. 1 is a perspective illustration of a mill stand and related components.

FIG. 1 provides a perspective view of a mill stand 10 incorporating linear bearings (or "liners") 12, with the pair of working rolls 14 and chock set 15 depicted in a removed state relative to the mill stand (or "roll stand) housing 16. During use, the linear bearings 12 engage linear bearings 18 attached to the roll stand housing 16 to limit movement of the rolls 14 to a generally horizontal direction. The bearings 18 include lubricant ports supplied via a lubrication delivery system as described in additional detail herein. Embodiments of linear bearings 16, 18 are disclosed in PCT applications, PCT/EP02/03010 and PCT/EP03/014573, each document being incorporated by reference herein. Additional linear bearings adaptable for use within a system in accordance with the present invention may be provided by Josua CORTS Sohn, Bearing Technology Division, of Remscheid DE.

Figure 2A:
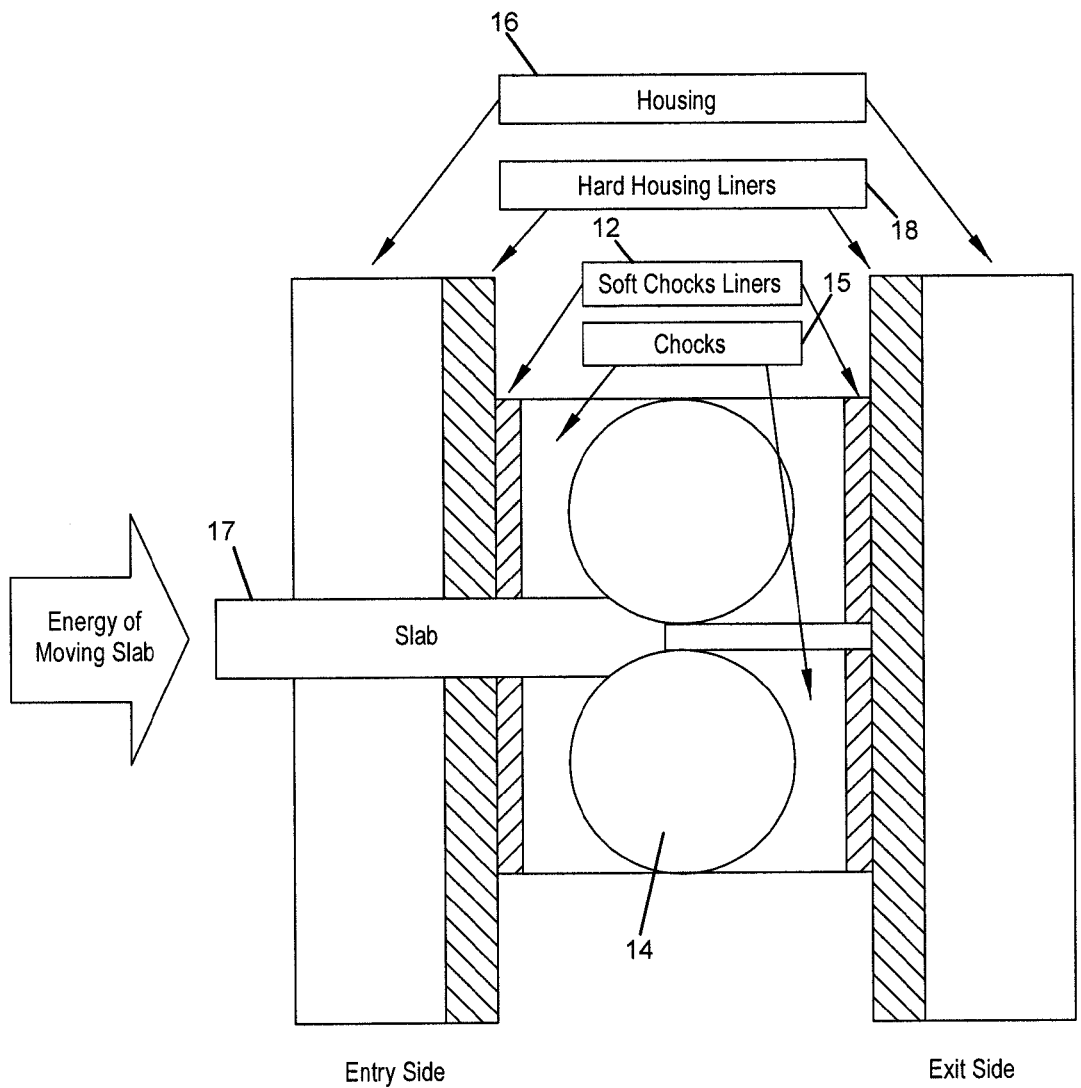
FIG. 2 is a depiction of a mill stand in a non-worn condition.

FIG. 2*a* provides a side elevational view depiction of a mill stand incorporating linear bearings. The mill stand of FIG. 2*a* depicts components in relatively new, unworn condition. The mill roll is held between mill stand sides by chocks 14 and liner pairs 16. The chocks and chock liners move vertically during operation with the chock liners being in sliding contact with the housing liners. As depicted, slab product 17 moves through roll stand 16. In such a condition, the impact of the rolling mill energy is dispersed across a substantial portion of the chock liner surfaces.

FIG. 2b is a top elevational view depiction of the mill stand of FIG. 2a. The direction of slab movement is illustrated by the arrows. FIG. 2b illustrates a mill stand in optimum condition, where the impact of the slab into the mill stand is dispersed throughout the liner surfaces.

Figure 3A:
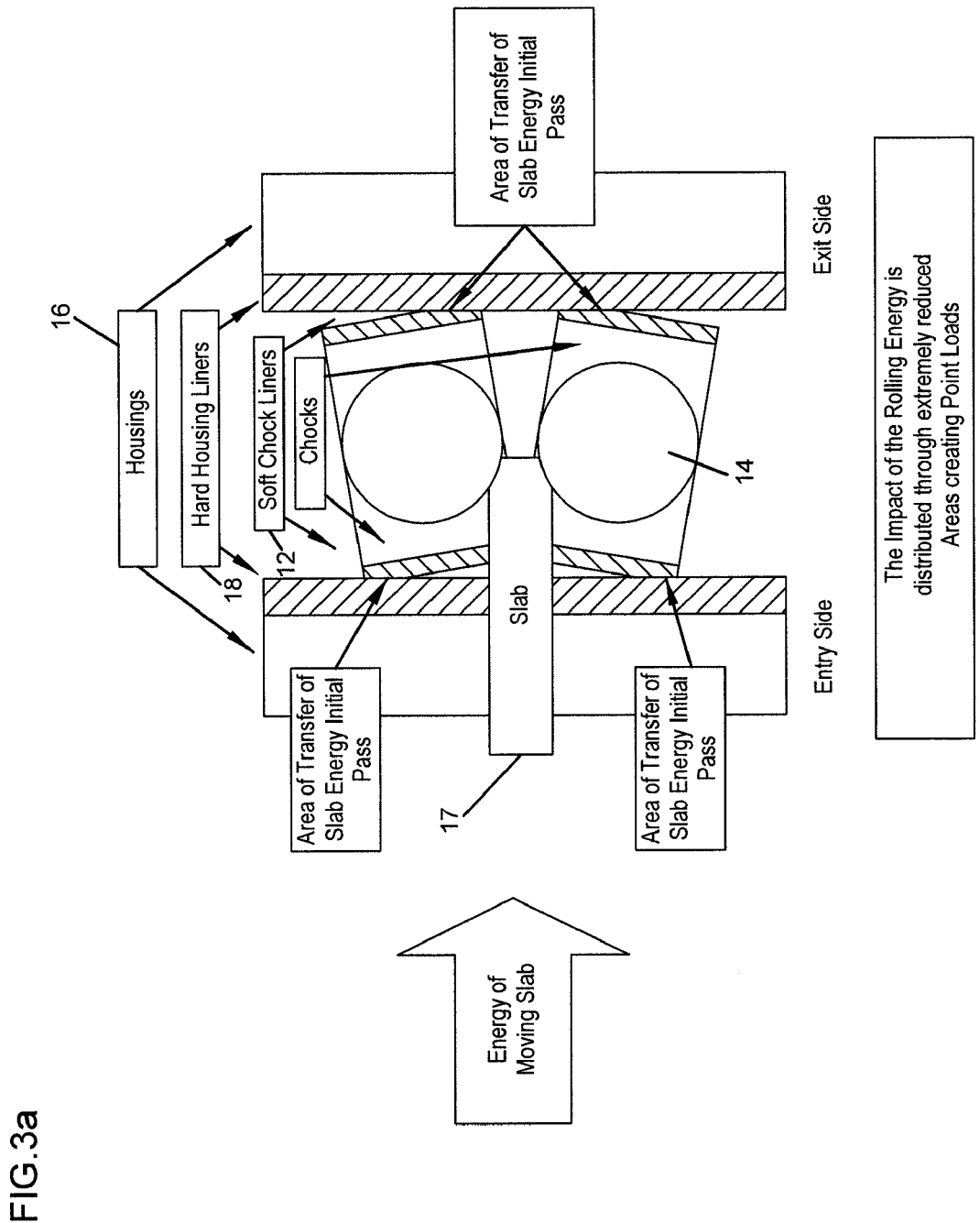
FIG. 3 is a depiction of the mill stand of FIG. 2 in a worn condition.
Figure 3B:
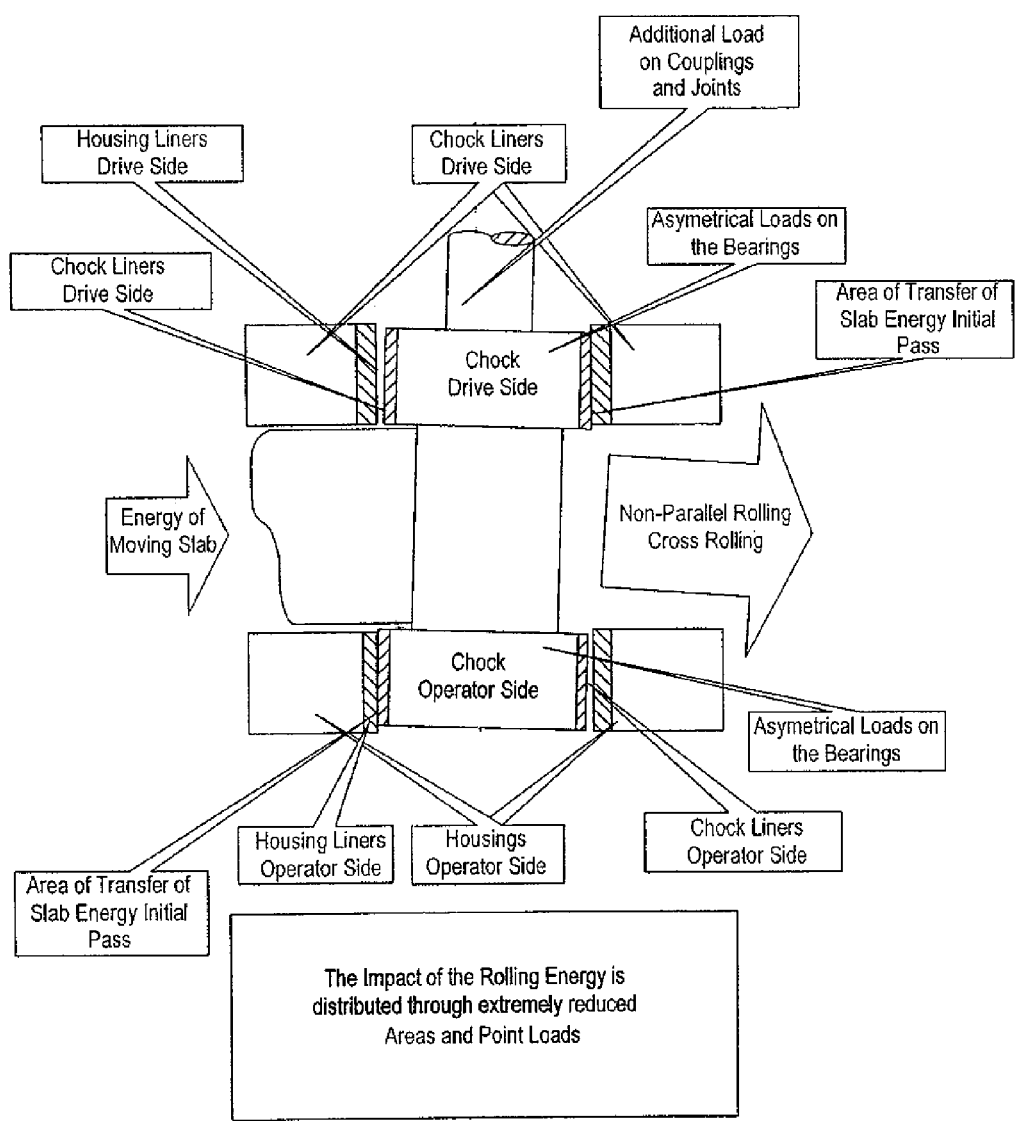

A mill stand incorporating worn linear bearings is shown in FIG. 3a. The mill stand of FIG. 3a depicts the bearing components in a worn condition. In such a condition, the impact of the slab into mill stand is dispersed across a relatively small portion of the chock liner surfaces creating "point loads." Point loads can undesirably lead to localized mechanical failure. FIG. 3b is a top view depiction of the mill stand of FIG. 3a showing a non-parallel slab defect caused by worn liners.

Figure 4:
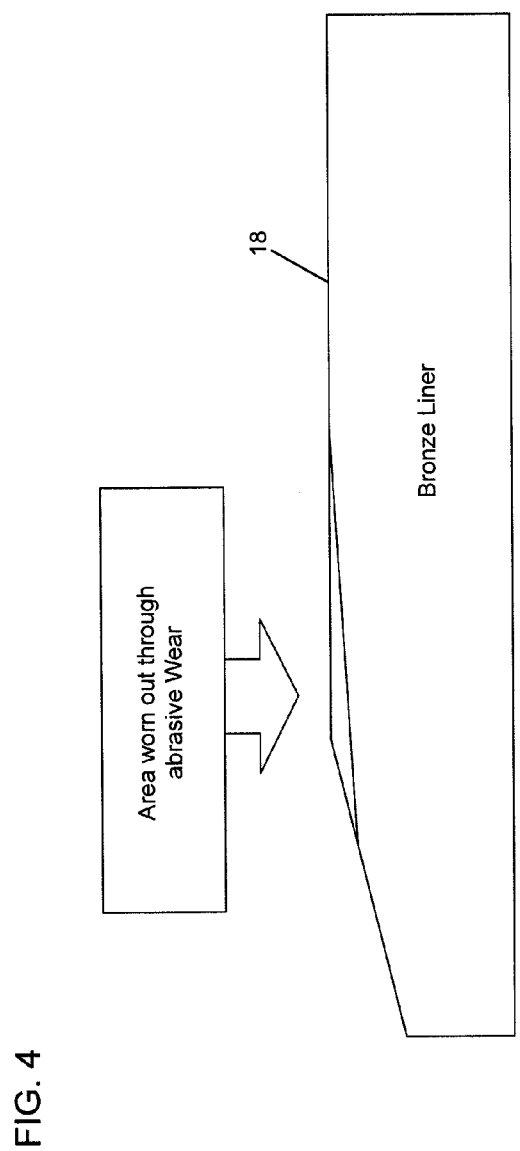
FIG. 4 illustrates a typical wear pattern of a liner plate.

FIG. 4 is a depiction of edge wear on a bronze liner plate. During use of the liners, significant edge wear can also be caused by contact during the roll exchange procedure.

Figure 5:
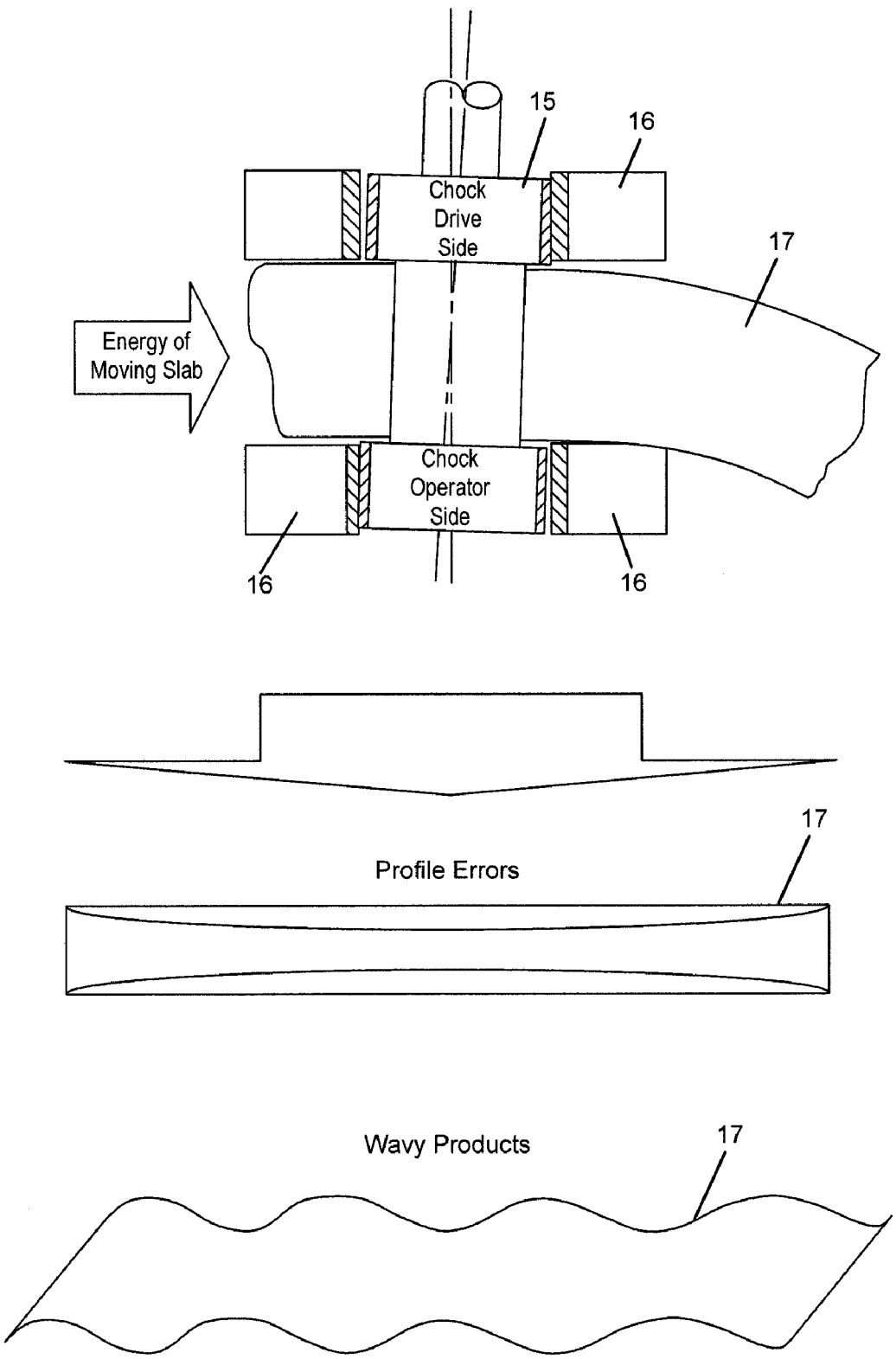
FIG. 5 illustrates poor quality yield of a worn mill stand.

FIG. 5 depicts results of non-rectangular rolling due to worm. Profile errors are found in the products as manifested by waves, crowns, chatter marks and other defects. Product manufactured with such flaws yields a significantly lower price per ton. Similarly, the economic consequences of non-rectangular rolling due to increased liner clearances are significant. Profile and other defects yield lower quality products, increased scrap and shutdowns, increased maintenance costs, all yielding a substantial reduction in product price.

Figure 6:
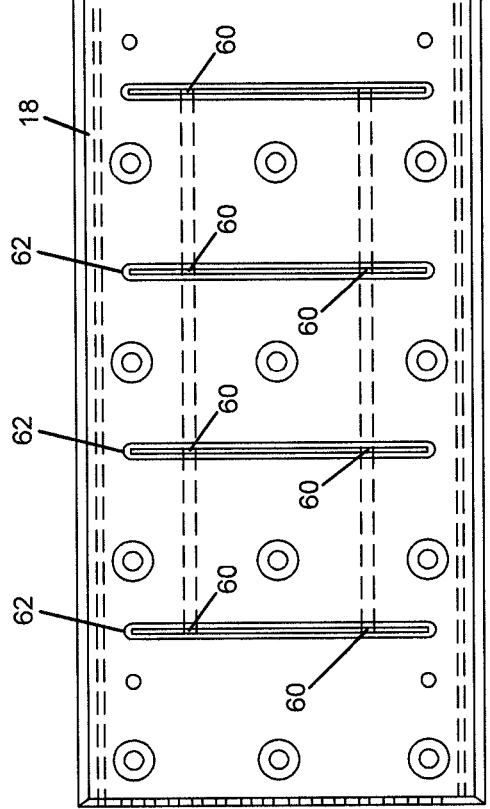
FIG. 6 is a plane view of a liner plate adaptable for use with the mill stand of FIG. 1.
Figure 7:
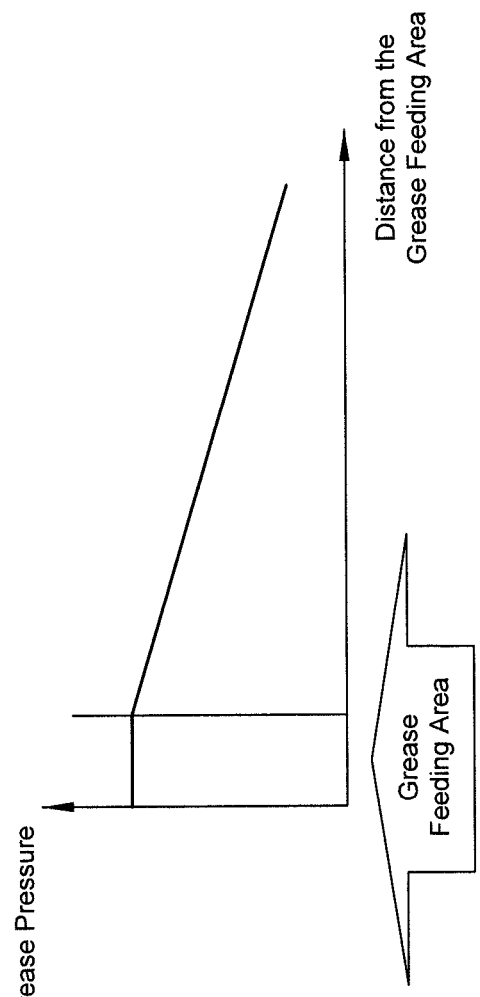
FIG. 7 is a graph showing a relationship between grease pressure and a distance from a grease outlet port on a liner plate.
Figure 8:
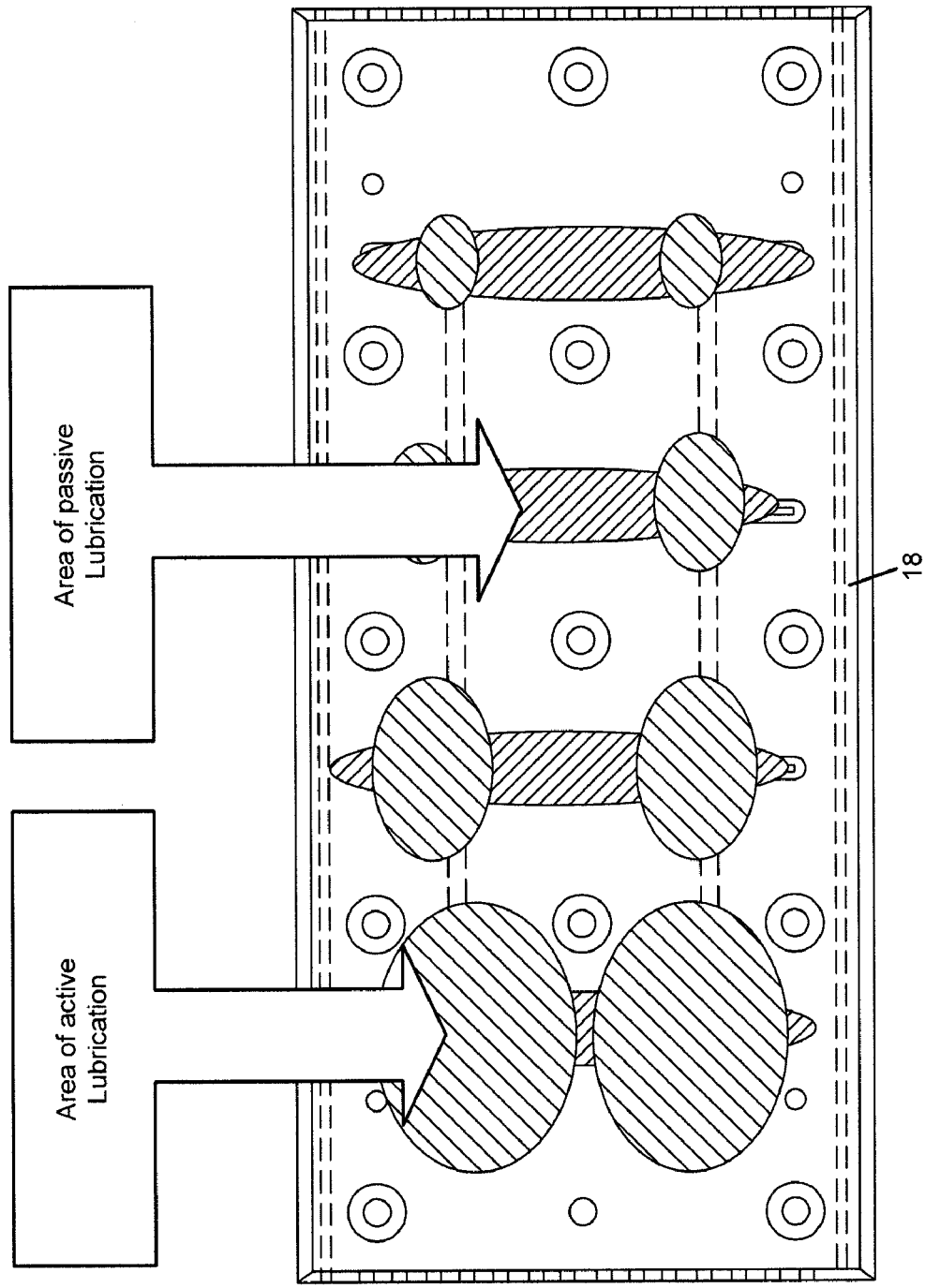
FIG. 8 illustrates areas of active and passive lubrication on a liner plate.

A liner 18 incorporating aspects of a lubrication system of the present invention is shown in FIG. 6. Pressurized lubricant exits ports 60 within the grooves 62 during operation and is conveyed across portions of the liner surface. A substantial reduction in the coefficient of friction can be obtained using such a lubrication system. As shown in FIG. 7, grease pressure decreases outside of the grease feeding area as the distance from the grease feed aperture increases. FIG. 8 illustrates areas of active lubrication and passive lubrication for a liner 18 used in accordance with the present invention.

Figure 9:
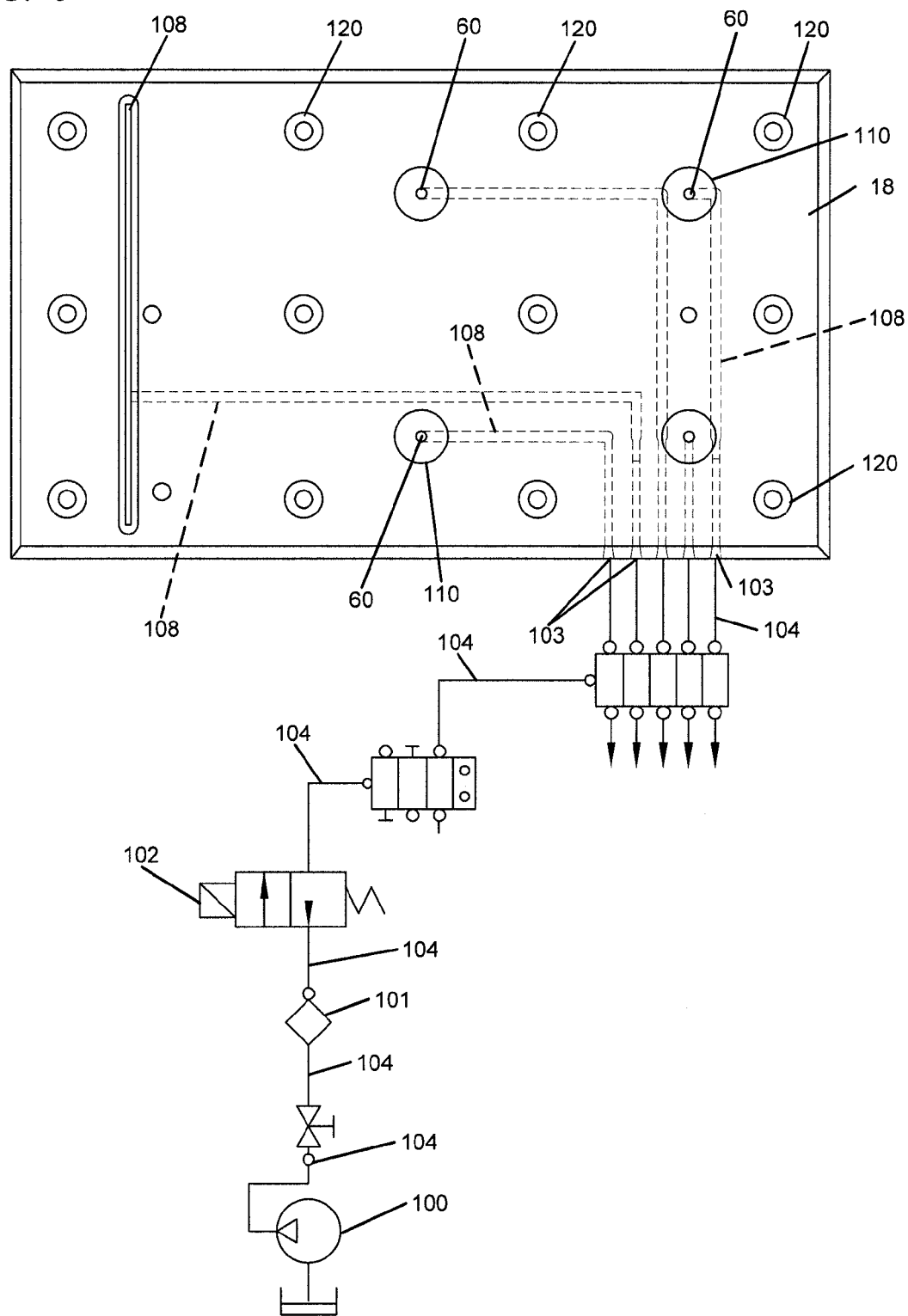
FIG. 9 illustrates a system for supplying lubricant to a liner plate.

An embodiment of lubrication system components for delivery of lubrication to a liner 18 is shown in FIG. 9. A pump 100 directs pressurized lubricant through filter 101 via conduit 104 and through fluid control valves 102 for delivery to liner inlet ports 103. Pressurized lubricant is directed through liner 18 via a plurality of conduits 108. The conduits 108 may be defined by a plurality of channels, machined or otherwise formed in the back or front surface of the liner 18. Once installed on the housing 16, the channels cooperate with a surface of housing 16 (or chock set) to define a plurality of closed conduits for feeding lubricant to the plurality of ports 60. Inlet port 103 is shown on the side of the liner 18, though in alternative embodiments an inlet port may exist on other surfaces of the liner.

Figure 10:
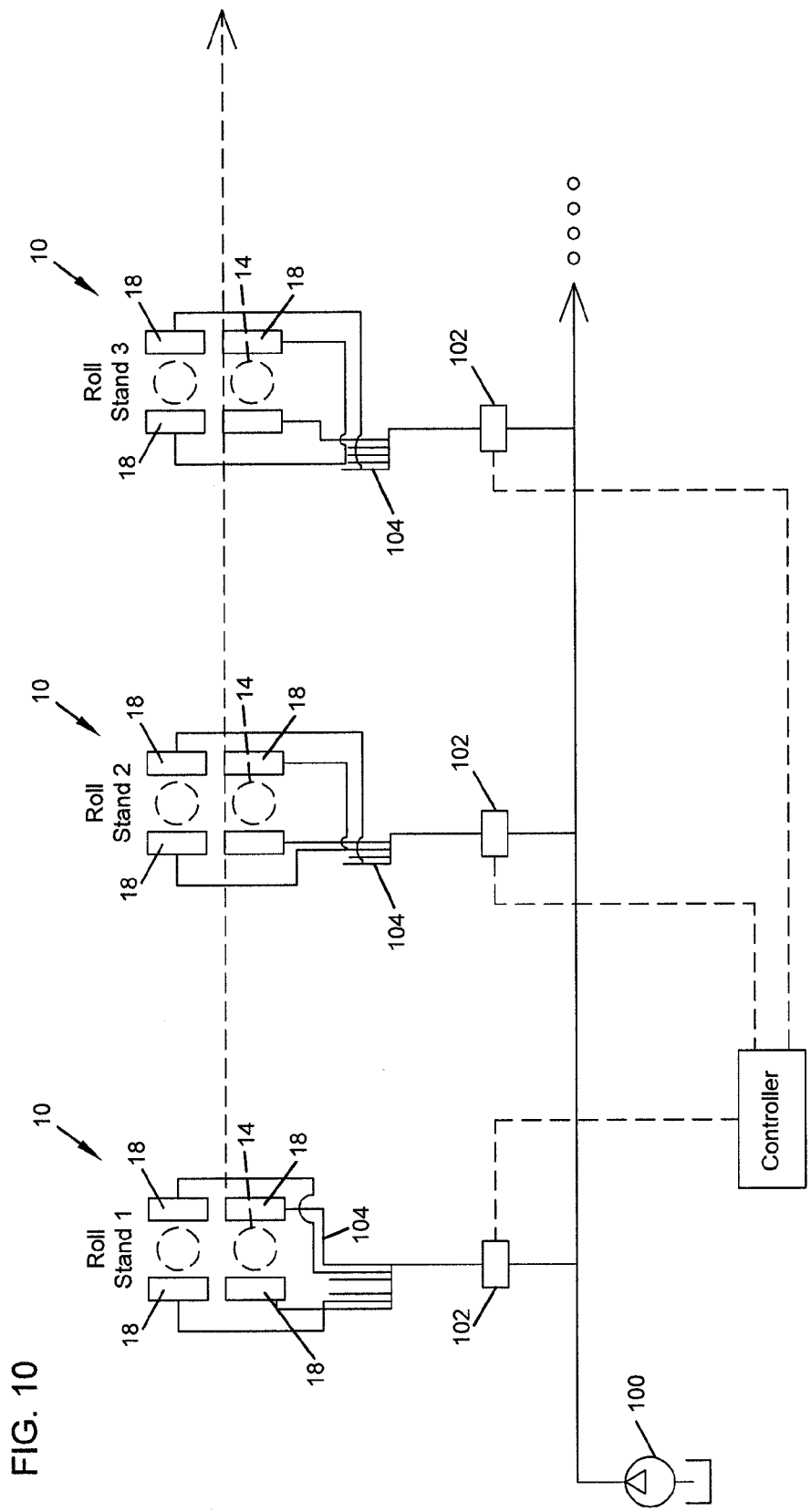
FIG. 10 illustrates a rolling facility having a plurality of mill stands and a centralized lubrication system.
Figure 12:
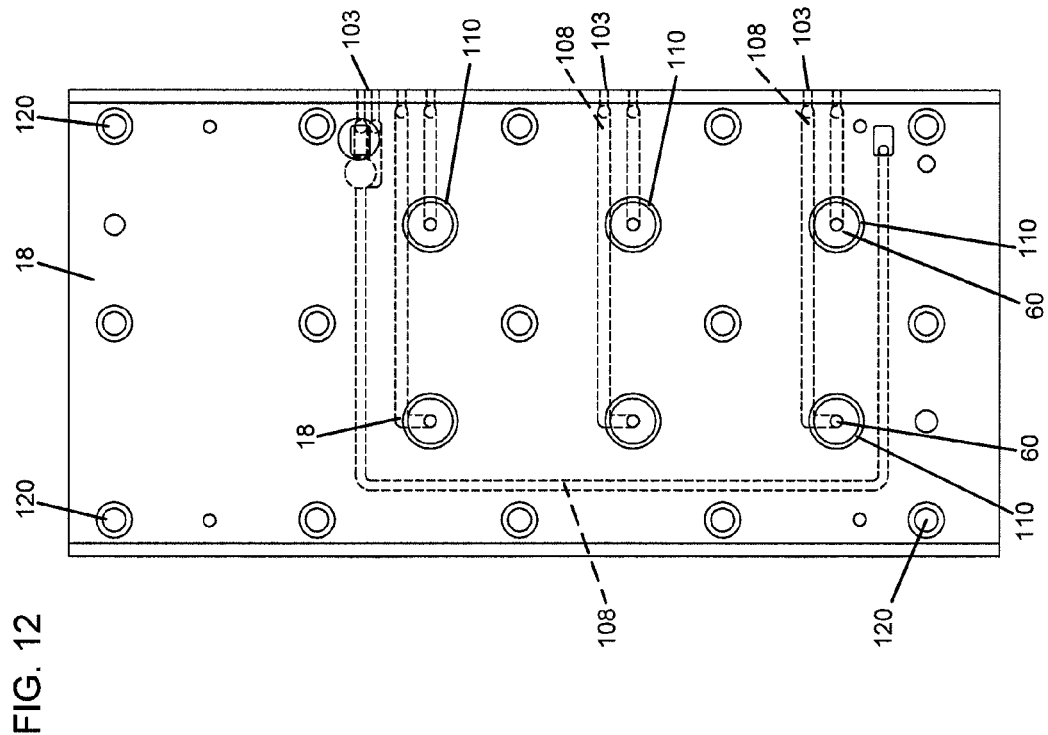
FIG. 12 is a plan view of the other side of the liner plate of FIG. 11.
Figure 11:
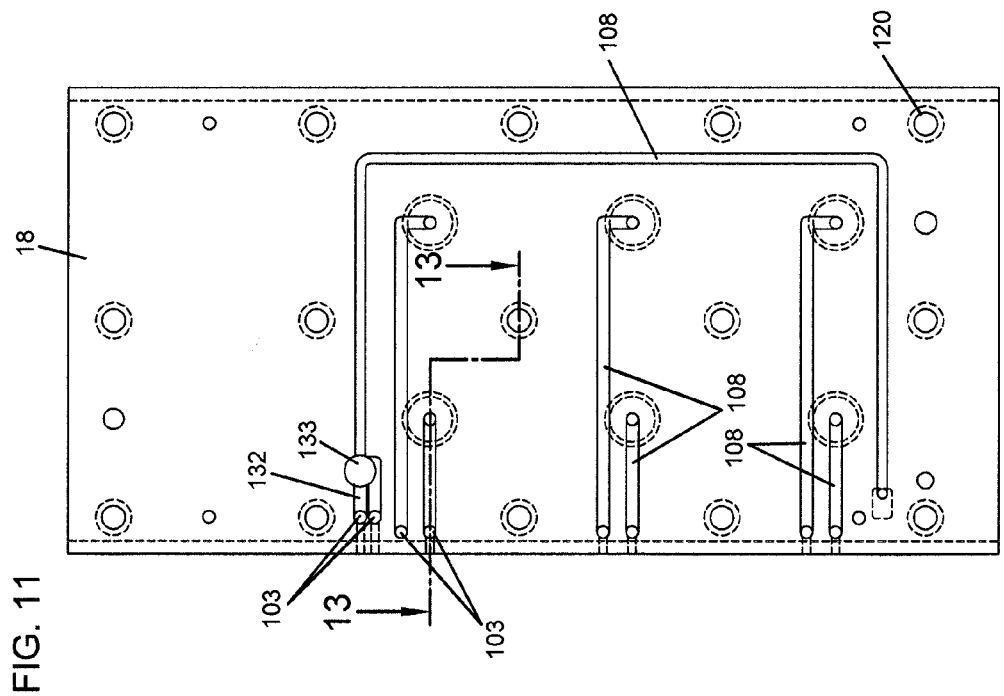
FIG. 11 is a plan view of one side of a liner plate in accordance with the present invention.
Figure 13:
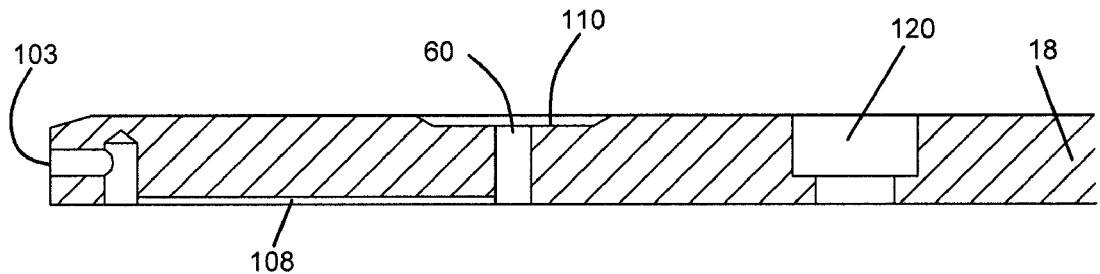
FIG. 13 is a cross-sectional view taken along lings A-A of FIG. 11.
Figure 14:
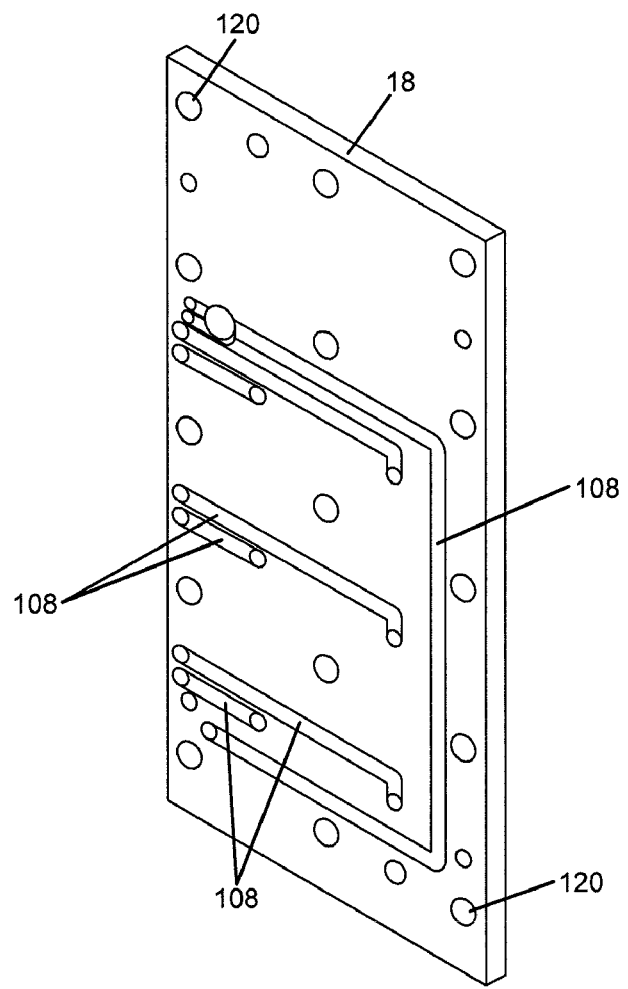
FIG. 14 is a perspective view of the liner plate of FIG. 1.

Additional aspects of a centralized lubrication system in accordance with the present invention are shown in FIG. 10. A central lubrication system provides a lubricating film between the surfaces of liners 18 of a plurality of roll stands 16, achieving a reduction of the temperature inside the liner, and limiting entry of cooling water or other contaminants into the bearing.

During operation, a centralized pump 100 and flow controls 102 may be controlled via a controller to distribute lubrication to various liners 18 within a facility. While the embodiment of FIG. 10 shows a single lubricant source, alternative systems may utilize multiple different lubricants and provide different lubricants to different liners within the facility or at different times during a rolling campaign. In another example, a plurality of lubricant point sources may be positioned in the immediate vicinity of given mill stands. For example, a 55 gallon drum of a lubricant may be associated with one mill stand to supply a predetermined lubricant to the liner surfaces. A pump 100 feeds the lubricant directly, or via a distribution block to the liners 18. An oil film is thus formed from the fed lubricant. Benefits of a centralized lubricant system include a reduction in lubricant consumption, prolonged anti-friction bearing life, a reduction in disposal and maintenance costs, and precise metering of lubricant.

FIGS. 11-14 show a liner plate 18 used in accordance with the present invention. The liner plate 18 includes a plurality of apertures 120 for securing the liner 18 to a housing 16 and a plurality of apertures 106 for emitting lubricant. The lubricant apertures 106 are connected to an internal conduit 108 to an inlet port, here shown located at the side of the liner 18.

The lubrication-carrying conduits 108 may be associated with a single lubricant port 60 or may be associated with more than one lubricant port 60. The lubricant ports include a cup-shaped generally cylindrical depression 110 suitable to contain a volume of lubricant during use. One benefit of the distributed lubricant ports 60 is an equalization of pressure across the liner 18 surface during operation. By maintaining equalized pressure, uneven wear of the liner 18 surface can be minimized.

The internal conduits may be formed by a machining operation whereby a channel is cut into the surface of the liner plate. In operation, the channel and a portion of the an adjacent liner together define a generally closed conduit capable of controlling the flow of lubricant toward the lubricant outlet ports.

As described above, lubricant is introduced into the liner 18 via inlet ports. These ports may be fed by a pressurized distribution system as described above. The same lubricant may be introduced into the inlet ports or different lubricants can be introduced in different inlet ports.

The liner plate of FIGS. 11-14 also show a sensor wire conduit 132 extending across a portion of the liner 18 surface. A sensor wire (not shown) is received within the conduit 132 and is connected at one end to a sensor and to a connector at another end. The sensor may be a gap sensor 133 for determining a displacement between the liner plate and another surface.

Figure 15:
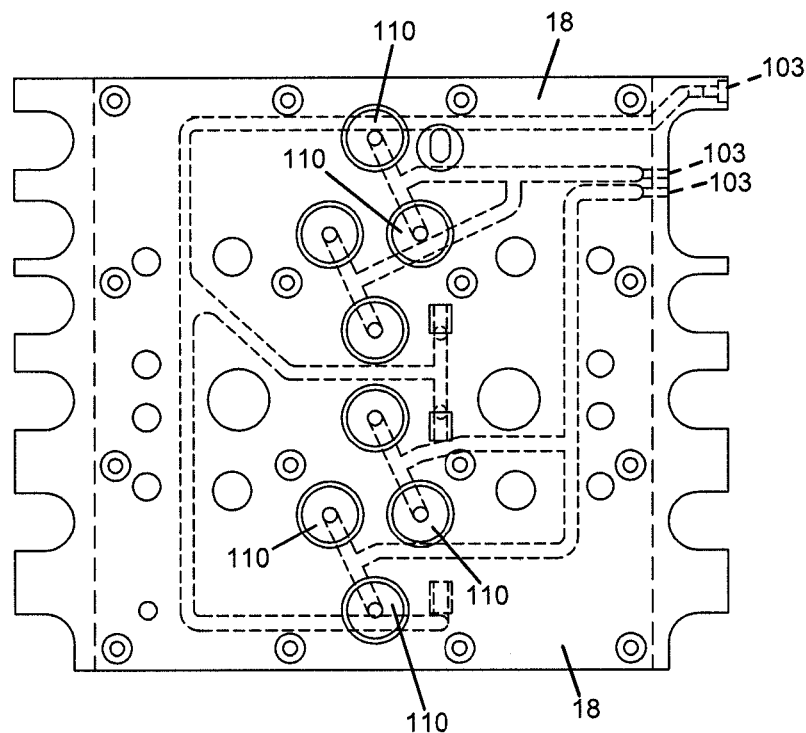
FIG. 15 is a plan view of one side of another embodiment of a liner plate in accordance with the present invention.
Figure 16:
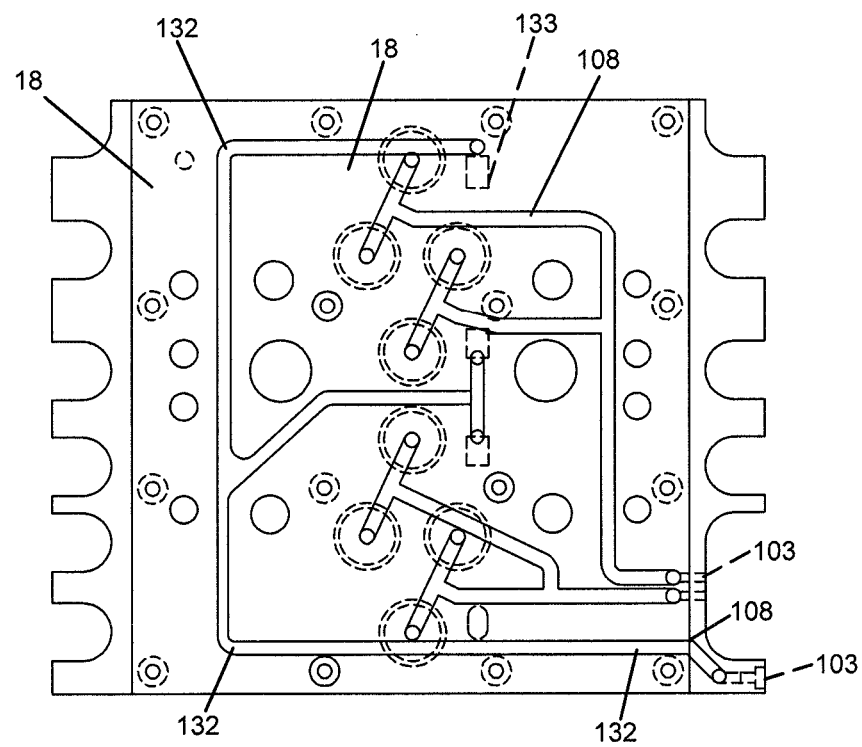
FIG. 16 is a plan view of the other side of the liner plate of FIG. 15.
Figure 17:
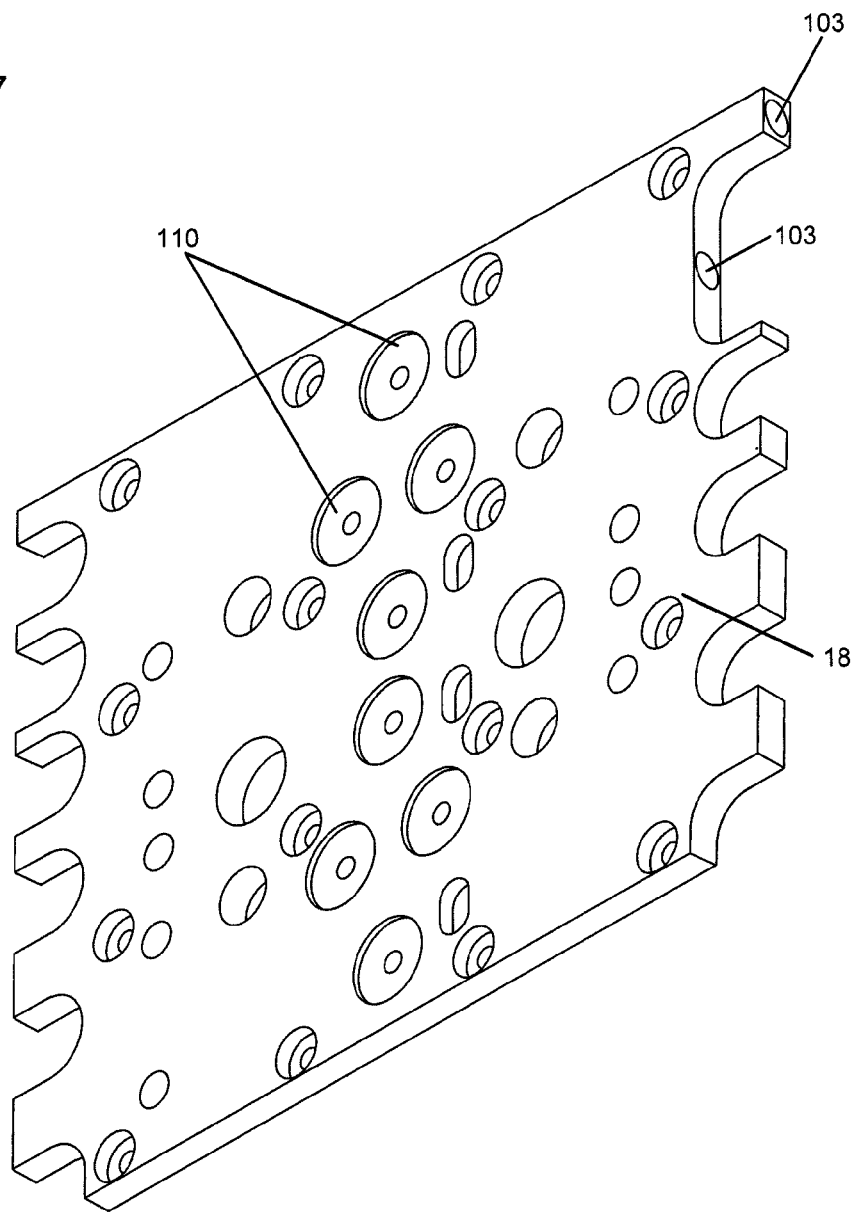
FIG. 17 is a perspective view of the liner plate of FIG. 16.

FIGS. 15-17 show another embodiment of a liner plate 18 adaptable for use within a system in accordance with the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A linear plate of a bearing assembly for a rolling mill, said linear plate comprising:
   a generally planar bearing plate having a support surface attached to a planar support surface of a housing of a mill stand and having a bearing surface opposite the support surface which engages a movable bearing surface of the mill stand during operation, said bearing plate attached to said mill stand by a plurality of fasteners passing through apertures in the bearing plate, with said apertures extending through the bearing plate from the support surface to the bearing surface, with said plurality of fasteners fixing the position of the plate relative to the support surface of the mill stand housing during said operation; and
   a plurality of stationary lubrication conduits defined by channels in the support surface of the bearing plate and the support surface of the housing, said plurality of lubrication conduits providing fluid communication between at least one outlet port to the bearing surface of the bearing plate and a lubricant inlet port positioned on a side of the bearing plate between the support surface and the bearing surface, whereby pressurized lubricant is introduced into the lubricant inlet port, passes through the plurality of lubrication conduits and is expelled out of the at least one outlet port to provide lubrication between the stationary bearing surface of the bearing plate and the movable bearing surface of the mill stand during a rolling campaign.

2. The linear plate of claim 1 wherein the bearing plate is secured to the mill stand via a plurality of threaded fasteners passing through the apertures of the bearing plate.

3. The linear plate of claim 1 further comprising:
   a sensor conduit extending within the bearing plate, said sensor conduit being defined by a channel in the support surface of the bearing plate and the support surface of the mill stand housing.

4. The linear plate of claim 3 wherein the sensor conduit extends between a connector positioned at the side of the bearing plate between the support surface and the bearing surface and a sensor received within the plate.

5. The linear plate of claim 1 wherein a lubricant source provides for centralized lubrication of a plurality of mill stands.

6. The linear plate of claim 5 wherein the lubricant source includes a plurality of different lubricants, with different lubricants being distributed to different mill stands within a facility.

7. The linear plate of claim 1 wherein the at least one outlet port is connected to at least one lubricant cup open to the bearing surface of the bearing plate.

8. The linear plate of claim 7 wherein the at least one lubricant cup is generally cylindrical in form and extends from the bearing surface toward the support surface of the bearing plate.

9. A rolling facility comprising:
   a plurality of mill stands, with each mill stand having at least one roll supported by a plurality of planar bearing plates, with each planar bearing plate having a bearing surface adapted to engage a movable surface of a roll stand component during a rolling operation, with each planar bearing plate having a support surface opposite the bearing surface which is secured against a support surface of a mill stand housing, with a plurality of fasteners passing through apertures in the bearing plate for fixing the position of the bearing plate relative to the support surface of the mill stand, and said bearing plate having a plurality of internal conduits providing fluid communication between at least one outlet port to the bearing surface and at least one lubricant inlet port positioned on a side of the bearing plate between the bearing surface and the support surface, with each of the plurality of conduits defined by a channel in the support surface of the bearing plate enclosed by the support surface of the mill stand.

10. The rolling facility of claim 9 further comprising:
   a lubricant source and a plurality of external conduits in fluid communication with the lubricant source and the inlet port of the bearing plate; and
   at least one control device for selectively controlling a flow of pressurized lubricant through one or more of the plurality of external conduits and the internal conduits of the planar bearing plate, said pressurized lubricant being expelled out of the at least one port to provide lubrication between the bearing surface and the movable surface of the roll stand component.

11. The rolling facility of claim 9 further comprising:
   a pump for pressurizing the lubricant.

12. The rolling facility of claim 11 wherein the pump and the at least one control device is controlled via a mill stand controller.

13. The rolling facility of claim 9 wherein the lubricant source is a centralized lubricant source.

14. The rolling facility of claim 9 wherein the lubricant source includes a plurality of different lubricants, with different lubricants being distributed to different mill stands within a facility.

15. The rolling facility of claim 9 further comprising:
   a sensor conduit defined between a channel in the support surface of the bearing plate and the support surface of the mill stand housing.

16. The rolling facility of claim 15 wherein the sensor conduit extends between a connector positioned at the side of the bearing plate between the support surface and the bearing surface and a sensor received within the bearing plate.

* * * * *